US00RE37644E

(19) United States
(12) Reissued Patent
Hausmann

(10) Patent Number: US RE37,644 E
(45) Date of Reissued Patent: Apr. 9, 2002

(54) MULTI-FUNCTIONAL ELECTROGRAPHIC PRINTER DEVICE

(75) Inventor: Gerhard Hausmann, Olching (DE)

(73) Assignee: Oce Printing Systems GmbH, Poing (DE)

(21) Appl. No.: 09/304,226

(22) PCT Filed: May 8, 1995

(86) PCT No.: PCT/DE95/00602

§ 371 Date: Apr. 1, 1996

§ 102(e) Date: Apr. 1, 1996

(87) PCT Pub. No.: WO96/14605

PCT Pub. Date: May 17, 1996

Related U.S. Patent Documents

Reissue of:
(64) Patent No.: 5,713,071
Issued: Jan. 27, 1998
Appl. No.: 08/624,461
Filed: Apr. 1, 1996

(30) Foreign Application Priority Data

Nov. 4, 1994 (DE) ..... 44 494 93

(51) Int. Cl.[7] ..... G03G 15/00
(52) U.S. Cl. ..... 399/401; 399/384; 399/402
(58) Field of Search ..... 399/384, 388, 399/397, 400, 401, 402

(56) References Cited

U.S. PATENT DOCUMENTS 4,609,279 A 9/1986 Hausmann et al.
5,546,178 A * 8/1996 Manzer et al. ..... 399/384
5,659,875 A * 8/1997 Manzer et al. ..... 399/384

FOREIGN PATENT DOCUMENTS

| | | | |
|---|---|---|---|
| DE | 3 221 059 | | 12/1983 |
| DE | 4 235 704 | | 3/1994 |
| EP | 0 154 695 | | 9/1985 |
| EP | 0 469 164 | | 2/1992 |
| JP | 57-105375 | * | 6/1982 |
| JP | 63-182669 | * | 7/1988 |
| WO | 89/04510 | | 5/1989 |
| WO | 92/14192 | | 8/1992 |
| WO | 94/27193 | | 11/1994 |

OTHER PUBLICATIONS

Japanese Abstract, vol. 17, No. 77, Feb. 16, 1993, M–1367, 4–278372.

K. Sanders, "Two–Path Electrophotographic Print Process", IBM Technical Disclosure Bulletin, vol. 22, No. 6, Nov. 1979, pp. 2465–2466.

* cited by examiner

*Primary Examiner*—Quana M. Grainger
(74) *Attorney, Agent, or Firm*—Schiff Hardin & Waite

(57) ABSTRACT

An electrographic printer device for printing tape-shaped recording media (10) in duplex and simplex printing contains two transfer printing stations (15/1,15/2) that can be pivoted against and away from the photoconductive drum (11). The first transfer printing station (15/1) serves for transferring toner images allocated to the front side, the second transfer printing station (15/2) serves for transferring back side toner images. A mechanical buffer storage (29) and a turn-over means (28) with preceding intermediate fixing station in the form of a photoflash fixing station (31) are arranged between the transfer printing stations (15/1,15/2).

46 Claims, 5 Drawing Sheets

CENTRAL UNIT
CPU
DATA CONTROL
DC
BUS
PAGE MEMORY
SP
VS I RS
HOST
MOTOR
10
11
12
13
14
15/1
15/2
16
17
18
19
20
21
22
23
24
25
26
27
28
29
29/2
29/3
30
31
100

CENTRAL UNIT
CPU
BUS
DATA CONTROL
DC
SP
VF1 VF2
PAGE MEMORY
HOST
15/2
11
14/2
23
29/2
15/1
14/1
29
31
29/3
22
28
19
18

MULTI-FUNCTIONAL ELECTROGRAPHIC PRINTER DEVICE

Matter enclosed in heavy brackets [ ] appears in the original patent but forms no part of this reissue specification; matter printed in italics indicates the additions made by reissue.

BACKGROUND OF THE INVENTION

The present invention is directed to a multi-functional electrographic printer device for single-sided or both-sided printing of web-shaped recording media in start/stop mode.

DESCRIPTION OF THE RELATED ART

A high economic benefit to the customer and a broad spectrum of flexibility are expected from modern electrographic printer systems to a greatly increasing extent. Both the effective utilization of printing materials as well as the flexible fashioning of the print information play a large part therein.

Endlessly processing (fan-fold) electrographic printer systems that print a web-shaped recording medium on one side have prevailed everywhere in the marketplace where a high device availability given high printing volume and a broad spectrum of material to be printed are demanded. These printer systems, however, have the disadvantage that it is not possible to change between single-sided and double-sided printing. For the user, this leads both to an economically unfavorable situation as well as being contrary to contemporary demands to maximize raw materials' utilization. Many customized applications wherein double-sided printing is compulsory (brochures, books, etc.) can thus not be satisfied, especially since electrographic high-performance printers are especially efficient when they are operated as free of interruption as possible.

For producing multi-color and double-sided printing with electrographic printer devices processing continuous stock, European Patent Document EP-B1-01 54 695 discloses that two continuous stock printers be operated following one another, whereby the paper printed in the first printer is turned over and is subsequently printed on the second side in the second printer.

The outlay for this known system is substantial due to the required, second printer.

The reference publication IBM Technical Disclosure Bulletin, Vol.22, No.6, November 1979, page 2466, in FIG. 2, also discloses an electrophotographic printer device for printing web-shaped recording media with which it is possible to print on both sides of the recording medium. To this end, the recording medium is pulled from a supply stack, supplied to a transfer printing station and provided with toner images on one side. After the toner fixing step, the recording medium is turned over and is resupplied to the transfer printing station. Another fixing in the fixing station ensues after the back side of the recording medium has been printed with toner images.

This old reference fundamentally discloses duplex printing with continuous stock recording media. The proposal, however, never led to a product. Further, the electrographic printer device disclosed therein is only suited for both-sided printing of the recording medium. A change of operating modes is not provided.

The reference publication Xerox Disclosure Journal, Vol.9, No.3, May 1984, Stanford, Conn., USA, pages 201 through 203, "Method for Duplex Printing on Continuous Web Paper", fundamentally discloses the possibility of printing continuous stock in simplex printing and duplex printing with one printer.

The known apparatus, however, does not include a switchable defection means, and an adaptation of the fixing station is required when changing operating modes.

The high-precision allocation of the individual device components needed for the operation of the printer device continues to require a stable structure of the apparatus.

High-performance printer devices for continuous stock paper are increasingly developing into components of extensive systems wherein the pre-processing and after-processing of the papers, backside and color printing play an increasing role in addition to the actual print production. A structure that enables a flexible adaptation to the system environment is therefore advantageous.

SUMMARY OF THE INVENTION

An object of the present invention is to provide an electrographic printer device for printing web-shaped recording media in changing operating modes with one and the same apparatus that is flexible constructed and that enables an adaptation to the greatest variety of user demands by the user in a simple way.

This and other objects and advantages of the invention are achieved by a multi-functional electrographic printer device for printing web-shaped recording media, having a motor-driven intermediate carrier with a means that generates toner images on the intermediate carrier; a first transfer printing station with controllable transfer printing means via which the toner images are transferred onto the recording medium in a transfer printing status and the toner images are left on the intermediate carrier in a rejection status; a second transfer printing station following the first transfer printing station in the conveying direction of the intermediate carrier, with controllable transfer printing means in order to transfer the toner images onto the recording medium in a transfer printing status; a recording medium transport channel arranged between the first and the second transfer printing station, having one or more added buffer storages dependent on the printer mode, as well as a turn-over means for the recording medium; and a fixing station following the second transfer printing station in the conveying direction.

Advantageous embodiments of the invention include an intermediate fixing station that at least partially fixes the toner images transferred onto the recording medium by the first transfer printing station, and in particular, have the intermediate fixing station and/or the fixing station fashioned as a photoflash fixing means.

The printer device may include a simplex transport channel that directly supplies the recording medium to the second transfer printing station proceeding from a supply region. It is also contemplated to include a means that produces toner images with preselectable color on the intermediate carrier. Preferably, a buffer storage that precedes the fixing station in recording medium conveying direction is provided. The buffer storage may be a looper.

In exemplary embodiments, a means for pivoting a transfer printing station in against and away from the intermediate carrier is provided.

The present invention also provides a method for two-sided printing of web-shaped recording media with a multi-functional electrographic printer device, including: generating a first sequence of toner images allocated to the front side of the recording medium and a second sequence of toner images allocated to the back side of the recording medium on a motor-driven intermediate carrier; transferring the first sequence of toner images onto the front side of the recording medium via a first transfer printing station and mechanical intermediate storage and turn-over of the recording medium printed with said first sequence; transferring the second sequence of toner images onto the back side of the recording medium via a second transfer printing station following the first transfer printing station in conveying direction of the intermediate carrier with the first transfer printing station deactivated; and fixing the toner images on the recording medium via a fixing station that follows the second transfer printing station in the conveying direction.

The method may provide that the toner images are intermediately fixed on the recording medium after the transfer of the first sequence of toner images.

In the inventive printer device, two transfer printing stations are arranged at the circumference of the photoconductive drum, whereby the first transfer printing station serves for printing the front side and the second serves for printing the back side. A mechanical intermediate storage area for the recording medium as well as a turn-over station are located between the transfer printing stations. For two-sided printing of the recording medium, the front side is printed first with the first transfer printing station, whereby the second transfer printing station is swivelled out and the paper does not move there. The paper runs from the first transfer printing station into the mechanical storage area and is subsequently turned over in a turn-over station. After the transfer printing operation of the front side, the paper transport to the first transfer printing station is stopped, this station is swivelled out, and the back side is then printed with the assistance of the second transfer printing station. The paper thereby runs from the intermediate storage area. Subsequently, the loose toner images are fixed in a thermal fixing station.

This alternating front/back printing with sheet-by-sheet start/stop of the paper web roughly corresponds to the printing rhythm of a single sheet machine with a duplex mode.

In order to prevent potential damage to the toner image of the front side during turning, an intermediate fixing with the assistance of a photoflash fixing means preceding the turn-over station can be advantageous.

The total of the printing times for both sides of the paper is available for conducting the final fixing step in the thermal fixing station; as a result thereof, fixing can be implemented interruption-free and at half speed. This enables a high fixing quality.

The start/stop mode can be suppressed for longer simplex printing and the paper is continuously printed with the first transfer printing station, for example with the second transfer printing station swivelled out, or a transfer printing ensues only via the second transfer printing station given direct feed via a separate simplex channel.

The printer means also makes it advantageously possible to printed a page with two-color printing, for example in what is referred to as the spot color method. To that end, a first, single-color toner image is generated via the first transfer printing station and a superimposed second image is then produced with the second transfer printing station.

It is likewise possible to print the front side with one color and to print the back side with a second color.

Overall, the tolerance variations of the print image registration precision is caused by only one device, this doubling the precision compared to the use of two coupled printers for generating duplex printing.

BRIEF DESCRIPTION OF THE DRAWINGS

Embodiments of the invention are shown in the drawings and are described in greater detail below by way of example. Shown are:

FIG. 3a is a schematic illustration of a paper flow path of an electrographic printer device operating in two-color simplex mode;

FIG. 3b is a block circuit diagram of a control for the printer of FIG. 3a;

DETAILED DESCRIPTION OF THE PREFERRED EMBODIMENTS

Figures 1A, 1B, 1C:
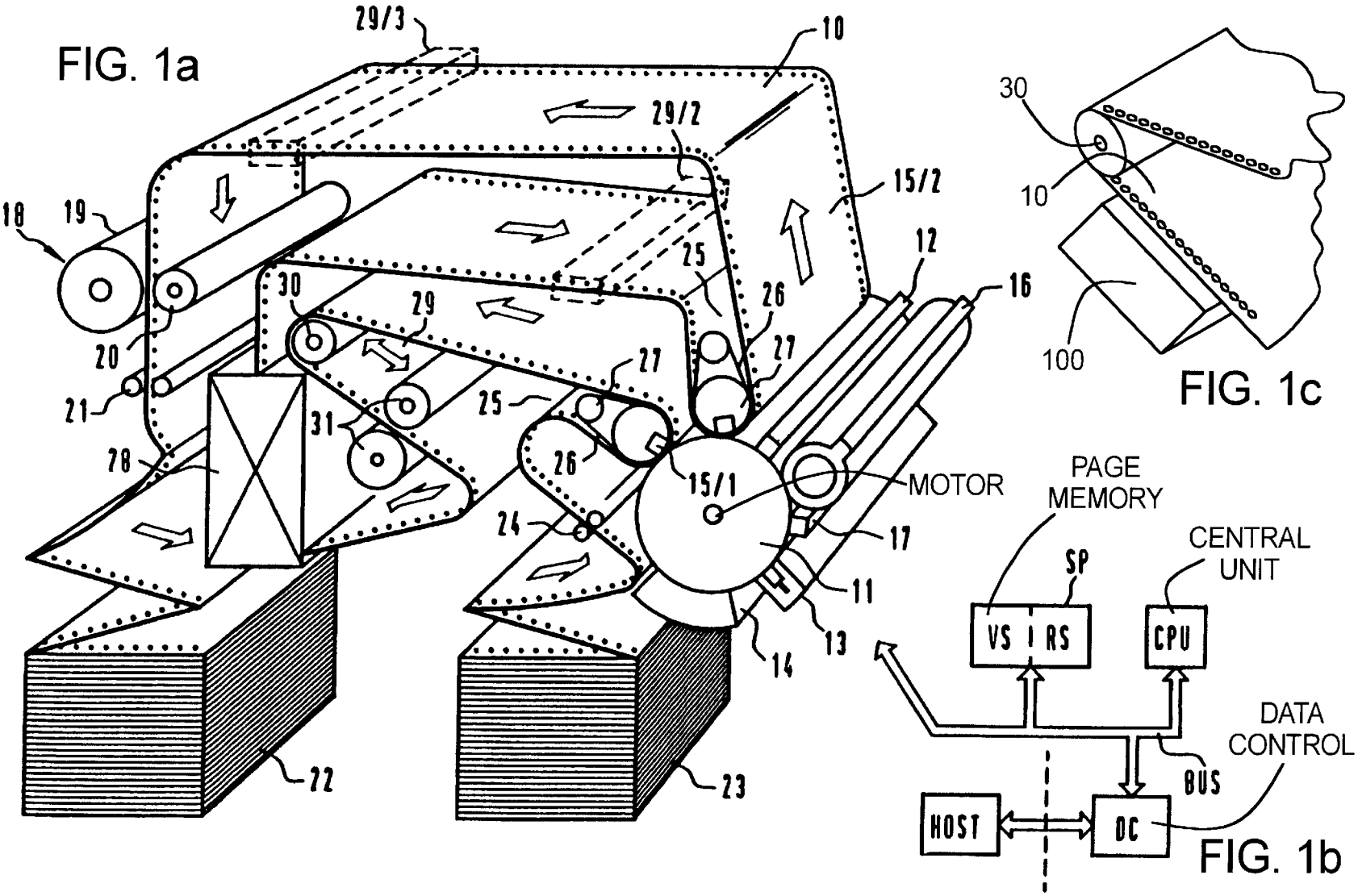
FIG. 1a is a schematic illustration of a paper path in an electrographic printer device for printing web-shaped recording media in duplex mode.
*FIG. 1b is a block diagram illustrating a page memory, central unit, and data control used in the system of the present invention;*
*FIG. 1c is a schemaic fragmentary perspective illustration of a preferred alternate embodiment of the first fixing station shown in FIG. 1a;*

An electrographic printer device for printing web-shaped recording media 10 differing in web width contains an electromotively driven photoconductive drum as an intermediate carrier 11. However, a web-shaped intermediate carrier, for example on OPC tape of a magneto-styli arrangement as disclosed, for example, by European Patent Document 191 521, can also be employed instead of the photoconductive drum. The various units for the electrophotographic process are grouped around the intermediate carrier 11. These are, essentially: a charging means 12 in the form of a charging corotron for charging the intermediate carrier 11; a character generator 13 with a light-emitting diode comb for character-dependent exposure of the intermediate carrier 11 that extends over the entire usable width of the intermediate carrier 11; a developer station 14 for inking the character-dependent charge image on the intermediate carrier 11 with the assistance of a single-component or two-component developer mix; a first transfer printing station 15/1 that extends over the width of the intermediate carrier 11 and with which the toner images are transferred onto the front side of the recording medium 10; and a second transfer printing station 15/2 that extends over the width of the intermediate carrier 11 and with which the toner images are transferred onto the back side of the recording medium 10. The two transfer printing stations 15/1 and 15/2 can be individually swivelled in against and away from the intermediate carrier (the photoconductive drum) 11 via a motor-driven swivelling mechanism SW that serves as a control means. The transfer printing stations contain drivable transfer printing corotrons. A cleaning station 16 with cleaning brushes integrated therein with appertaining extraction means as well as a discharge means 17 is provided for removing the residual toner after the development and after the transfer printing steps. The intermediate carrier 11 is electromotively driven and moves in the arrow direction during print mode.

The printer device further contains a fixing station 18 following downstream from the second transfer printing station 15/2 in the conveying direction of the recording medium, this fixing station 18 being fashioned as a thermal pressure fixing station with a heated fixing drum 19 having appertaining pressure roller 20, as well as guide rollers 21 following the fixing station that serve, among other things, as output elements for a stacker means 22 for the recording medium 10. Instead, of the illustrated fixing station, other fixing stations, for example with a heated or unheated admission saddle, or a cold fixing station are also possible.

The web-shaped recording medium 10, for example, is fabricated as pre-folded continuous stock provided with margin perforations and is supplied to the first transfer printing station 15/1 via delivery rollers 24 proceeding from a supply region 23. However, it is also possible to supply a recording medium without margin perforations via a roller delivery.

The conveying of the recording medium thereby preferably ensues a conveyor means 25 allocated to the transfer printing stations 15/1,15/2 and having the form of conveyor belts 26 provided with pins that, conducted over drive shafts 27, engage into the margin perforations of the recording medium 10. When a recording medium that is free of conveying holes is employed, it is at the command of a person skilled in the art to convey the recording medium with, for example, friction, controlled by a control arrangement that senses synchronization marks. Further, a duplex recording medium transport channel is located in the housing region of the printer device between the first 15/1 and the second 15/2 transfer printing station. A turn-over means 28 that serves the purpose of turning the recording medium over by 180° C. after the front side has been printed is allocated thereto. The turn-over means 28 can thereby contain two turner bars arranged at the angle of 90° relative to one another and over which the recording medium is conducted. Such a turn-over means is fundamentally known from the reference publication Xerox Disclosure Journal, Vol.9. No.3, May 1984, Stamford, Conn., USA, pages 201–203, "Method for Duplex Printing on Continuous Web Paper". A mechanical buffer storage 29 in the form of a looper with a displaceable deflection drum 30 is also allocated to the transport channel, as is an intermediate fixing station 31 that is composed of a thermal pressure fixing station similar to the fixing station 18 of the output side in the illustrated embodiment. However, it has proven beneficial to employ a photoflash fixing [means] *unit 100*, at least for the intermediate fixing, since the heating flash of the fixing [means] *unit* is primarily absorbed by the toner and reflected by the non-tonered regions, this stressing the paper less than a thermal pressure fixing.

Additional buffer storages 29/2,29/3—that are only schematically illustrated here—in the form of loopers can also be arranged in the region between turn-over station 28 and second transfer printing station 15/2 as well as preceding the fixing station of the output side.

The printer device is controlled via a printer controller, schematically shown in FIG. 1a, comprising a central unit CPU, a page memory SP that is divided into memory areas that are page-dependent, for example having verso and recto page memory areas VS and RS, respectively, as well as comprising a data control unit DC. All units of the controller are connected to one another and to the units of the printer device via a bus system.

The function of the printer device is described below with reference to the individual operating modes:

Single-Color Duplex Mode

For both-sided, single-color printing of the recording medium 10, the information for the front side are first read into the page memory SP in a memory area for the front side VS, and the information for the back side are read in in a memory area RS for the back side. The character-dependent generation of a corresponding sequence of toner images via the electrophotographic units subsequently ensures, whereby a first sequence of toner images that is allocated to the front side (as shown by the solid line arrow) of the recording medium is first generated on the photoconductive drum 11. These toner images are transferred onto the front side of the recording medium 10 with the assistance of the first transfer printing station 15/1. The second transfer printing station 15/2 is thereby pivoted out and the conveying of the recording medium is arrested in the region of the second transfer printing station 15/2. While the front side of the recording medium is printed with a sequence of front side toner images, the recording medium 10 runs into the mechanical buffer storage 29 in the form of a loop and is intermediately stored therein. After the complete transfer printing of the front side images onto the front side of the recording medium 10, the transfer printing station 15/1 is pivoted out and the paper is stopped at the transfer printing station 15/1. A transfer of the back side toner images onto the back side (as shown by the broken-line arrow) of the recording medium 10 in the region of the second transfer printing station 15/2 ensures after the second transfer printing station 15/2 has been pivoted against the photoconductive drum 11. To this end, the recording medium 10 is pulled from the mechanical buffer storage 29 and the front side toner image located thereon is intermediately fixed in the intermediate fixing station 31 by photoflash fixing. The recording medium 10 is subsequently turned over in the turn-over station 28 and is supplied in its turned condition for transfer printing of the back side via the second transfer printing station 15/2. After the complete printing of the front side and back side with the corresponding plurality of front and back side toner images, the toner images are fixed by thermal pressure in the fixing station 18 at the output side and the paper is deposited via the stacking means 22.

The total of the printing times for both sides of the paper is thus available for the fixing time of a sheet; as a result thereof, fixing can be carried out interruption-free at half speed, which enhances the fixing quality. A further mechanical buffer storage 29/3 can be arranged preceding the fixing station in order to enable continuous passage through the fixing station. The same is true of the arrangement of a further mechanical buffer storage in the form of a looper 29/2 in the region between turn-over station 28 and second transfer printing station 15/2. This buffer storage 29/2 can accept the recording medium in turned form emerging from the first buffer storage 29 and intermediately stores it, whereupon the transfer printing station 15/2 then pulls the recording medium with the printed front side out of the looper 29/2 for printing the back side.

The printing steps are repeated after the two-sided printing with a sequence of toner images or with only a single toner image. This alternating front/back side printing with sheet-by-sheet start/stop of the recording medium approximately corresponds to the printing process of a single sheet machine operating in duplex mode.

A printing of the recording medium in the mixed mode, i.e. partly duplex and partly only simplex, is also possible in the described way. In simplex printing, either only the front side transfer printing station 15/1 or the back side transfer printing station 15/2 is activated.

For longer simplex printing, the start-stop mode can be suppressed, whereby only one of the two transfer printing stations 15/1 or 15/2 is then active given an embodiment of the printer device corresponding to FIG. 1.

Figure 2:
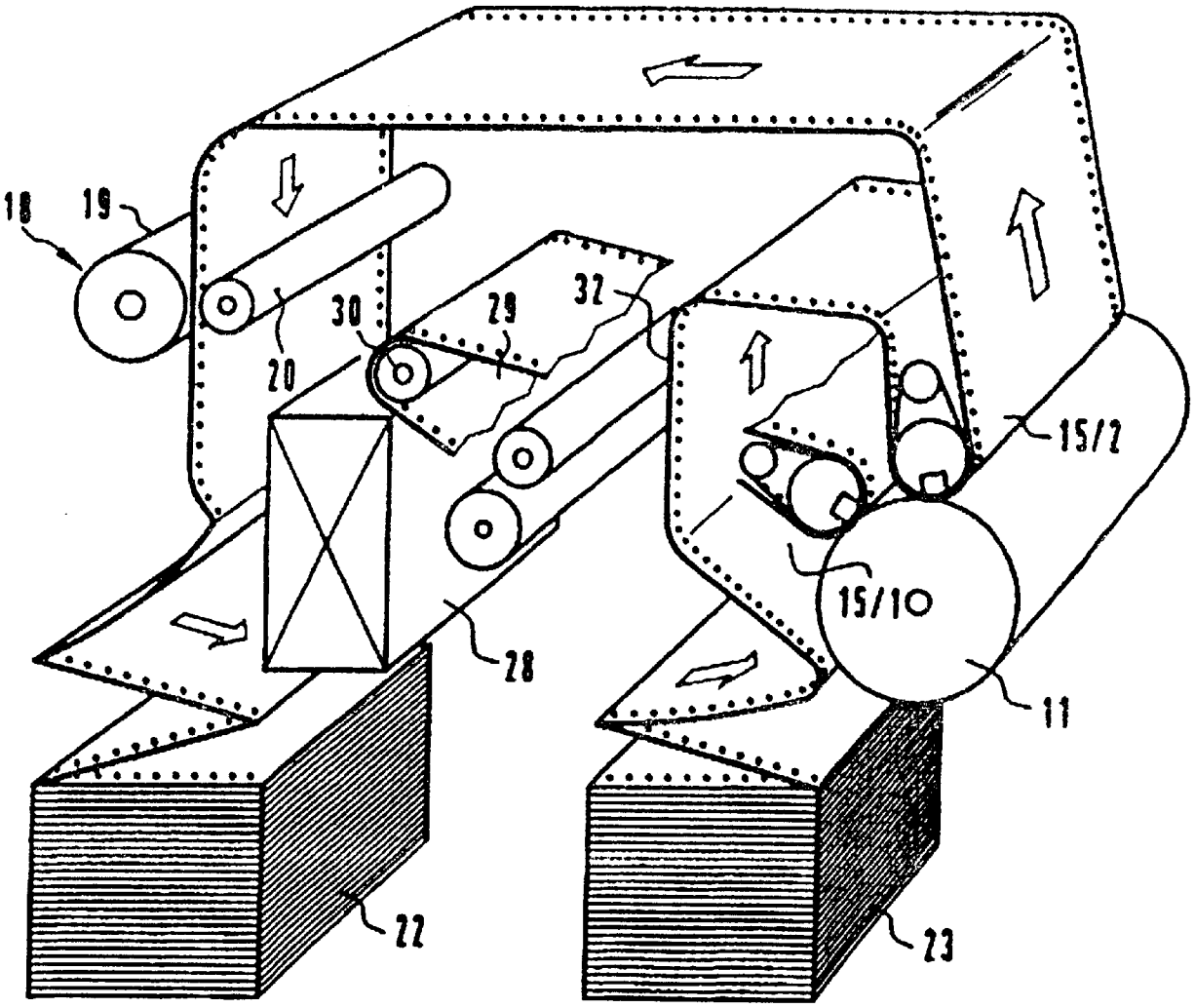
FIG. 2 is a schematic illustration of the paper path in the same electrographic printer device operated in simplex mode.

In an embodiment of the printer device according to FIG. 2, an introducible simplex transport channel 32 that supplies the web-shaped recording medium directly to the second transfer printing station 15/2 is arranged directly between the supply region 22 and the second transfer printing station 15/2. The generation of the toner images ensues in a standard way via the electrophotographic printer units with the allocated controller.

Color Printing

The printer device is also suitable for multi-color printing operation. To this end, two developer stations 14/1 and 14/2 that extend over the entire width of the photoconductive drum can be provided according to the illustration of FIG. 3. These can be driven separately from one another and contain toner of different colors. For example, black toner may be provided in the fixing station 14/2 and red toner in the fixing station 14/1.

Figures 3A, 3B:
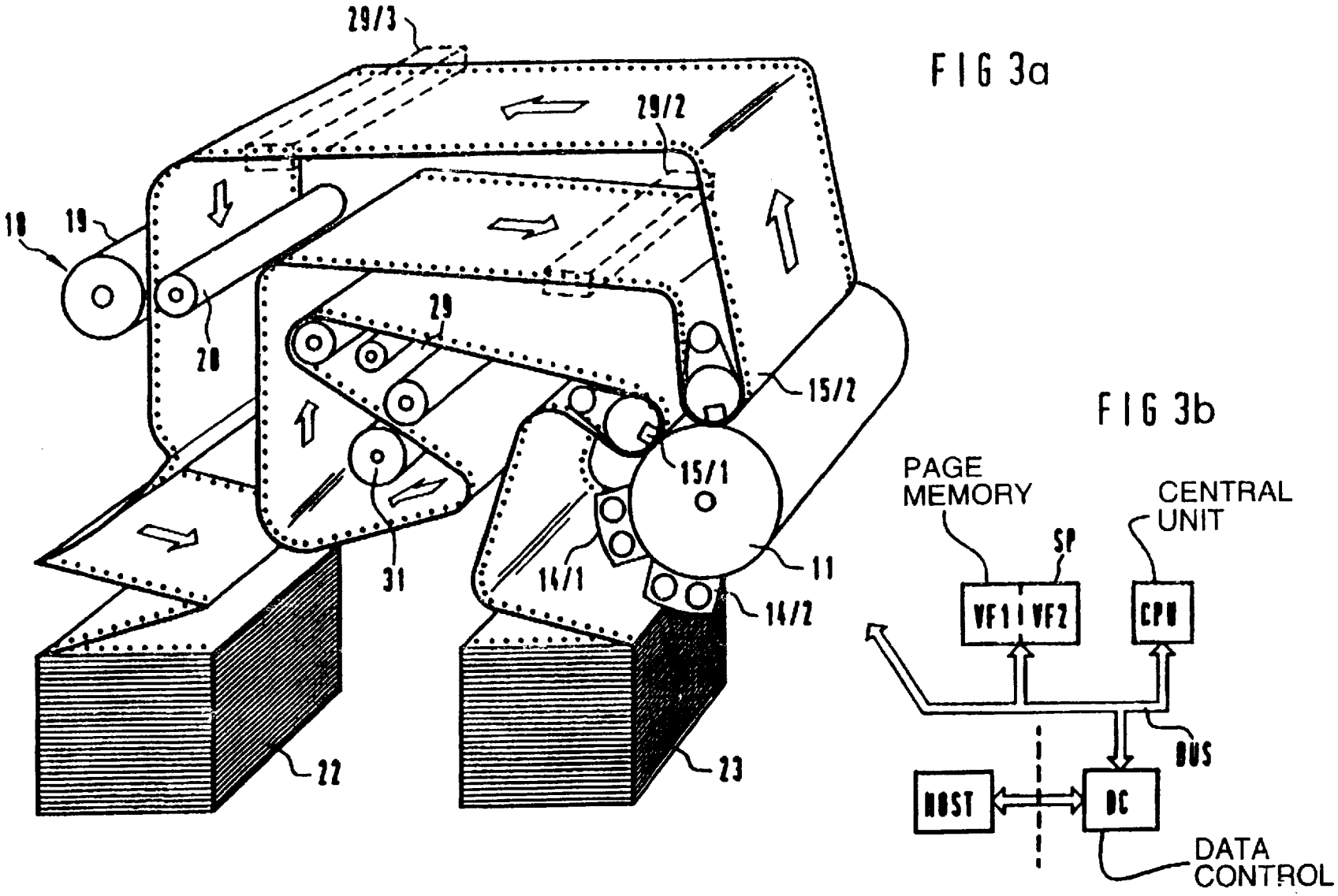

Corresponding to the illustration of FIG. 3, it is thus possible, for example, to produce two-color spot-color printing in the simplex mode. To this end, the memory areas VF1 of the page memory SP contain the image data of a front side image having, for example, the color red and the memory area VF2 of the page memory SP contains the image data of a front side color image having, for example, the color black. For two-color spot-color printing, for example on the front side of the recording medium, a toner image that, for example, is red is first generated via the transfer printing station 15/1 and is intermediately stored in the mechanical buffer storage 29. Subsequently, the transfer printing station 15/1 is pivoted away from the photoconductive drum 11 in the described way and the transfer printing station 15/2 is pivoted in. For imprinting the black toner image via this transfer printing station 15/2, the black toner image is moved from the buffer storage 22 and conducted via the transfer printing station 15/2. The turn-over station is either removed from the device or the recording medium is conducted through the turn-over station unturned or is conducted past the turn-over station.

It is often only papers with DIN A4 or letter size width that are printed in practice. In printers having a structural width that is twice DIN A4 or twice letter size according to the illustration in FIGS. 4 and 5, the entire structural width of the printer can be utilized—despite paper that is only DIN A4 or letter size in width—by right/left attachment of the two transfer printing stations 15/1 and 15/2 on the photoconductive drum 11. A doubled paper speed thereby derives both in single-web duplex mode corresponding to the illustration of FIG. 4 as well as in two-web simplex mode corresponding to the illustration of FIG. 5.

Figure 4:
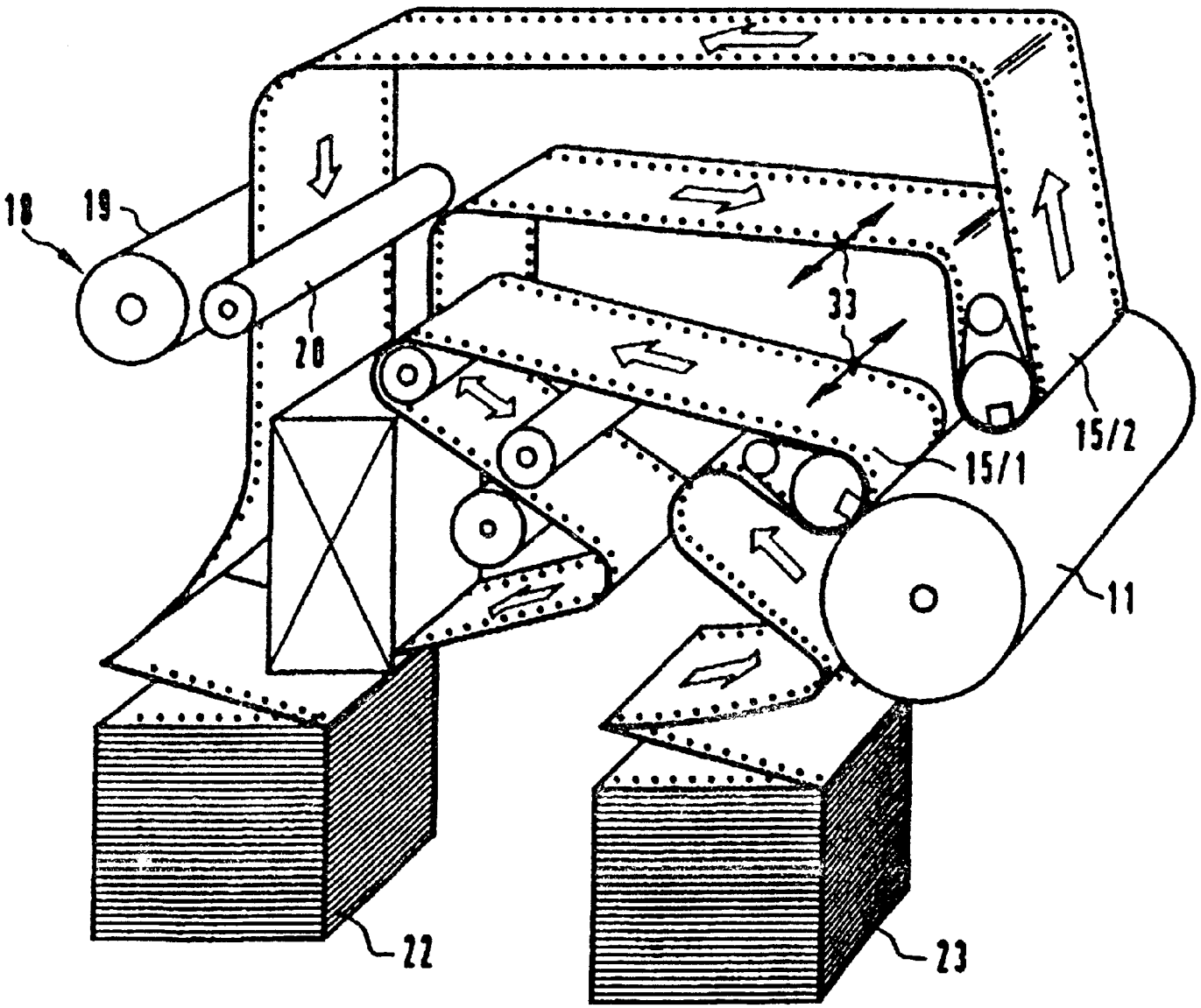
FIG. 4 is a schematic illustration of a paper flow path of an electrographic printer device operating in duplex mode with increased printing speed.
Figure 5:
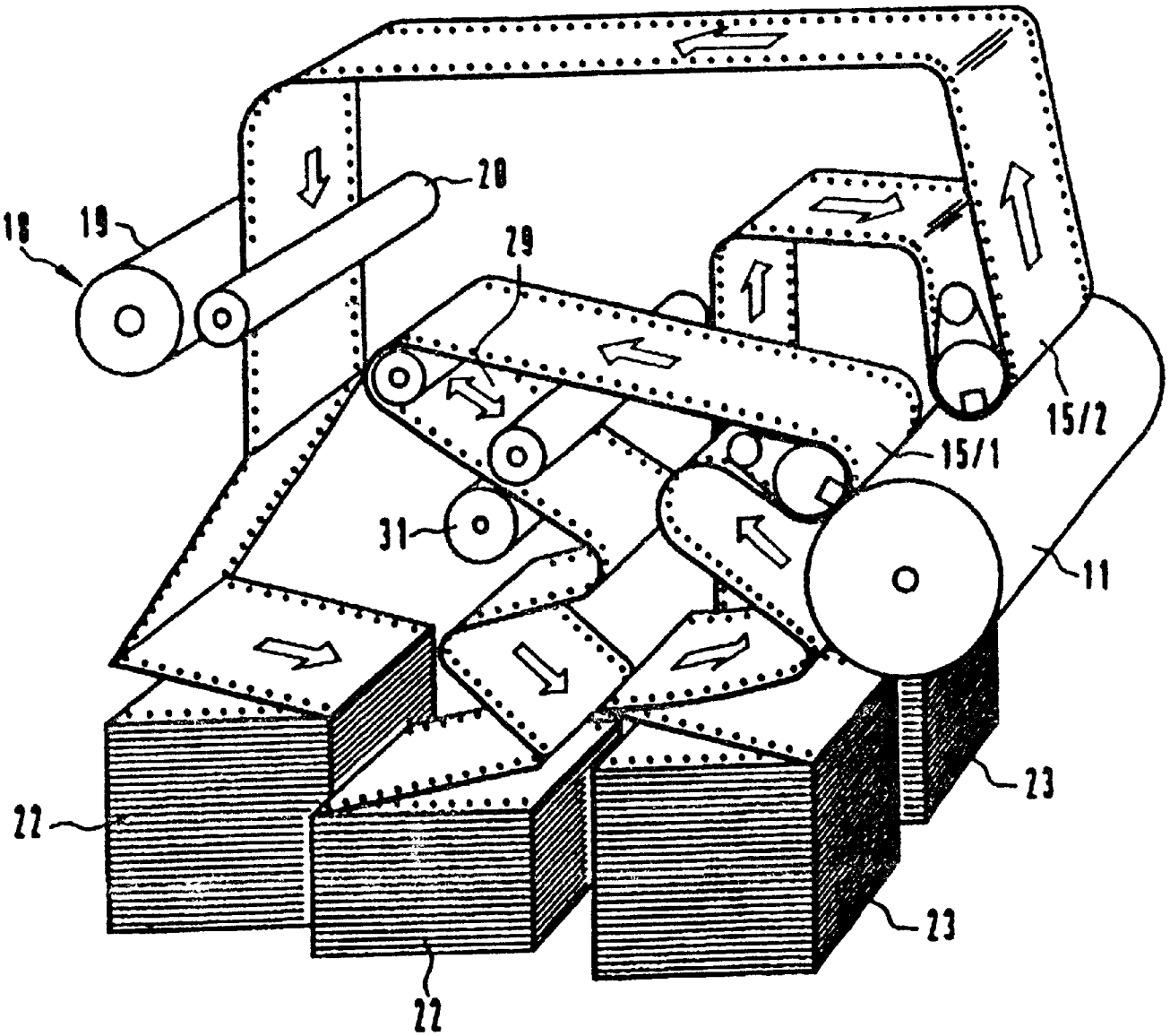
FIG. 5 is a schematic illustration of a paper flow path of an electrographic printer device operating in simplex mode with increased printing speed.

A printer device according to an embodiment of FIG. 4 can also contain a paper width adjustment means 33 indicated with arrows which makes it possible to employ recording media of different widths. This width adjustment means can, for example, be composed of an adjustable guide.

In the disclosed printer devices, the transfer corotrons are matched such to the required start/stop operation of the paper web such that a print image can be produced gap-free (slip fold printing). The settings and adjustments on the part of the operator for the paper web at the first transfer printing station 15/1 are transferred function-suited onto the second transfer printing station 15/2 electromechanically and are automatically co-adjusted thereat. The swivelling of the paper deflections in the turn-over means 28 can partly ensue automatically. Instead of printing a two-color print on one side corresponding to the described spot-color printing mode, a printer device according to the exemplary embodiment of FIG. 3, with introduced turn-over means, makes it possible to print the front side with one color and the back side of a continuous stock web with a second.

Although other modifications and changes may be suggested by those skilled in the art, it is the intention of the inventor to embody within the patent warranted hereon all changes and modifications as reasonably and properly come within the scope of his contribution to the art.

I claim:

1. A multi-functional electrographic printer device for printing web-shaped recording media, comprising a motor-driven intermediate carrier with a means for generating toner images on said motor-driven intermediate carrier;

a first transfer printing station with controllable transfer printing means for transferring toner images onto the recording medium a second transfer printing station following said first transfer printing station in a conveying direction of said motor-driven intermediate carrier, with controllable transfer printing means for transferring toner images onto the recording medium in a transfer printing mode;

a recording medium transport channel arranged between said first and said second transfer printing station, having at least one added buffer storages that are operable to store the recording media dependent on printer mode, as well as a turn-over means for turning over the recording medium; and a fixing station following said second transfer printing station in the conveying direction.

2. A multi-functional electrographic printer device according to claim 1, further comprising:

an intermediate fixing station that at least partially fixes the toner images transferred onto the recording medium by said first transfer printing station.

3. A multi-functional electrographic printer device according to claim 2, wherein said intermediate fixing station is a photoflash fixing means for fixing the toner image onto the recording medium by a photoflash.

4. A multi-functional electrographic printer device according to claim 1, comprising:

a simplex transport channel that directly supplies the recording medium to said second transfer printing station proceeding from a supply region.

5. A multi-functional electrographic printer device according to claim 1, comprising:

a means for producing toner images with preselectable color on said motor-driven intermediate carrier.

6. A multi-functional electrographic printer device according to claim 1, comprising:

a buffer storage that precedes said fixing station in the conveying direction.

7. A multi-functional electrographic printer device according to claim 1, comprising:

a buffer storage fashioned as a looper.

8. A multi-functional electrographic printer device according to claim 1, comprising:

a means for pivoting one of said first and second transfer printing stations in against and subsequently away from the intermediate carrier.

9. A method for two-sided printing of web-shaped recording media with a multi-functional electrographic printer device, comprising the steps of:

generating a first sequence of toner images allocated to a front side of the recording medium and a second sequence of toner images allocated to a back side of the recording medium on a motor-driven intermediate carrier;

transferring the first sequence of toner images onto the front side of the recording medium via a first transfer printing station and mechanical intermediate storage and turn-over of the recording medium printed with said first sequence; transferring the second sequence of toner images onto the back side of the recording medium via a second transfer printing station following the first transfer printing station in a conveying direction of the intermediate carrier with the first transfer printing station deactivated; and fixing the first and second toner images on the recording medium via a fixing station that follows the second transfer printing station in the conveying direction.

10. A method according to claim 9, further comprising the step of:

intermediately fixing the toner images fixed on the recording medium after the transfer of the first sequence of toner images.

11. A multi-functional electrographic printer device according to claim 1, wherein said fixing station is a photoflash fixing means for fixing the toner image onto the recording medium by a photoflash.

*12. A multi-functional printer device for printing a web-shaped recording medium, comprising:*

*a motor-driven intermediate carrier with a toner image generator at said motor-driven intermediate carrier;*

*a first transfer printing station with a controllable transfer printer for transferring toner images onto the recording medium;*

*an intermediate fixing station following said first transfer printing station;*

*said intermediate fixing station being a photoflash fixing unit for fixing the toner image onto the recording medium by a photoflash;*

*a second transfer printing station following said intermediate fixing station and said first transfer printing station in a conveying direction of said motor driven intermediate carrier, with a controllable transfer printer for transferring toner images onto the recording medium;*

*a recording medium transport channel arranged between said first and said second transfer printing stations having at least one buffer storage that is operable to store the recording medium dependent on printer mode, as well as a turn-over unit for turning over the recording medium; and*

*a thermal fixing station following said second transfer printing station.*

*13. A multi-functional printer device according to claim 12, further comprising:*

*said intermediate fixing station at least partially fixing the toner images transferred onto the recording medium by said first transfer printing station.*

*14. A multi-functional printer device according to claim 12, comprising:*

*a simplex transport channel that directly supplies the recording medium to said second transfer printing station proceeding from a supply region.*

*15. A multi-functional printer device according to claim 12, comprising:*

*a means for producing toner images with preselectable color on said motor-driven intermediate carrier.*

*16. A multi-functional printer device according to claim 12, comprising:*

*an additional buffer storage preceding said second fixing station.*

*17. A multi-functional printer device according to claim 12 comprising:*

*said buffer storage being fashioned as a looper.*

*18. A multi-functional printer device according to claim 12, comprising:*

*a means for pivoting one of said first and second transfer printing stations in against and subsequently away from the intermediate carrier.*

*19. The printer device according to claim 12 wherein the thermal fixing station comprises a pressure thermal fixing station.*

*20. A multi-functional printer device for printing a web-shaped recording medium, comprising:*

*a motor-driven intermediate carrier with a device for generating toner images on said motor-driven intermediate carrier;*

*a first transfer printing station with a controllable transfer printing device for transferring toner images onto the recording medium;*

*a second transfer printing station following said first transfer printing station in a conveying direction of said recording medium and having a controllable transfer printing device for transferring toner images onto the recording medium;*

*a recording medium transport channel arranged between said first and second transfer printing stations having an intermediate fixing station that at least partially fixes by a photoflash fixing device the toner images transferred onto the recording medium by said first transfer printing station; and*

*a thermal fixing station following said second transfer printing station in the conveying direction.*

*21. A multi-functional printer device according to claim 20 comprising a buffer storage that precedes said second transfer printing station in the conveying direction.*

*22. A multi-functional printer device according to claim 20, comprising a turn-over device in said transport channel for turning over the recording medium and which precedes said second transfer printing station in the conveying direction.*

*23. A method for spot-color printing of a web-shaped recording medium with a multi-functional printer device, comprising the steps of:*

*generating a first single color toner image and a second single color toner image on a motor-driven intermediate carrier;*

*transferring the first single color toner image onto the recording medium via a first transfer printing station and at least partially photoflash fixing the toner image onto the recording medium;*

*transferring the second single color toner image onto the at least partially photoflash fixed first single color toner image via a second transfer printing station following the first transfer printing station in a conveying direction of the recording medium; and*

*fixing the superimposed toner images on the recording medium via a thermal fixing station that follows the second transfer printing station in the conveying direction.*

*24. A method according to claim 23 further comprising the step of fixing the superimposed toner images on the recording medium via a thermal fixing station.*

*25. A method for printing a web-shaped recording medium, comprising the steps of:*

*generating a first sequence of toner images on an intermediate carrier;*

*applying toner to the intermediate carrier with a developer station;*

*transferring the first sequence of toner images from the intermediate carrier to the recording medium;*

*at least partially fixing the first sequence of toner images on the recording medium at a first flash fusing fixing station;*

*generating a second sequence of toner images onto the intermediate carrier;*

*transferring the second sequence of toner images onto the web-shaped carrier at a second transfer printing station from said same intermediate carrier; and*

*thermal fixing at least the second sequence of toner images onto the recording medium at a second thermal fixing station.*

*26. A method according to claim 25 wherein a turnover station is provided between the first and second transfer printing stations and wherein the first transfer printing station transfer the first sequence of toner images onto a first side of the web-shaped recording medium and the second transfer printing station transfers the second sequence of toner images onto an opposite second side of the recording medium.*

*27. A method according to claim 25 including the step of moving the first transfer printing station away from the intermediate carrier prior to transferring the second sequence of toner images from the intermediate carrier onto the web-shaped recording medium at said second transfer printing station.*

*28. A method according to claim 25 including the step of buffer storing the web-shaped recording medium after the first fixing station and before the second transfer printing station.*

*29. A method according to claim 25 including the step of providing at said developer station a first developer station portion for applying toner of a first color and a second developer station portion for applying a toner of the second color to the intermediate carrier.*

*30. A method according to claim 25 including the step of generating the first and second sequence of toner images by an electrophotographic method wherein the intermediate carrier is charged.*

*31. A method according to claim 30 including the step of providing a character generator with light emitting diodes for character-dependent exposure of the charged intermediate carrier.*

*32. A method according to claim 25 including the step of providing multi-functional capability by selectively turning over the web-shaped recording medium at a turnover station between the first and second transfer printing stations wherein duplex printing on both sides of the recording medium is desired and for selectively not turning over the web-carrier recording medium when printing the first and second sequence of toner images on a same side of the recording medium.*

*33. A method for printing a web-shaped recording medium, comprising the steps of:*

*generating a first sequence of toner images on an intermediate carrier;*

*transferring the first sequence of toner images onto the recording medium via a first transfer printing station;*

*at a first fixing station at least partially fixing the first sequence of toner images on the recording medium;*

*generating a second sequence of toner images on an intermediate carrier;*

*at a second transfer printing station following the first transfer printing station in a conveying direction of the intermediate carrier transferring the second sequence of toner images onto the recording medium;*

*fixing at least the second sequence of toner images on the recording medium at a second fixing station; and*

*printing in first and second colors with the respective first and second sequences of toner images.*

*34. A method according to claim 33 including the step of providing said first fixing station as a flash fusing station.*

*35. The method according to claim 33 including the step of providing said second fixing station as a thermal fixing station.*

*36. The method according to claim 33 including the step of turning over the recording medium between the first and second transfer printing stations so as to allow duplex printing of the recording medium on both sides of the recording medium.*

*37. The method according to claim 33 including the step of providing a buffer storage for the recording medium between the first and second transfer printing stations.*

*38. The method according to claim 33 including the step of generating the first and second sequences in an electrographic method employing electrostatic charging for attracting toner particles.*

*39. The method according to claim 33 including the step of providing said first and second fixing stations with non-contact fixing.*

*40. The method according to claim 39 wherein said non-contact fixing comprises flash fusing.*

*41. The method according to claim 33 including the step of providing at least said second fixing station as a thermal fixing station employing two rollers between which the recording medium is pressed and wherein at least one of the rollers is heated.*

*42. The method according to claim 33 including the step of providing said web-shaped recording medium from the folded stack which unfolds as a recording medium is fed to the first transfer printing station.*

*43. The method according to claim 33 including the step of providing said web-shaped recording medium as a continuous web which remains uncut at an output accumulation station.*

*44. The method according to claim 33 including the step of providing the web-shaped recording medium as a continuous web which is not cut prior to output from the second transfer printing station.*

*45. The method according to claim 33 including the step of providing a space between the first transfer printing station and the recording medium when the second transfer printing station is transferring the second sequence of images onto the recording medium.*

*46. A multi-functional printer device for printing a web-shaped recording medium, comprising:*

*a motor-driven intermediate carrier with a device for generating toner images on said motor-driven intermediate carrier;*

*a first transfer printing station with a controllable transfer printing device for transferring toner images onto the recording medium;*

*a second transfer printing station following said first transfer printing station in a conveying direction of said recording medium and having a controllable transfer printing device for transferring toner images onto the recording medium;*

*a recording medium transport channel arranged between said first and second transfer printing stations having an intermediate fixing station that at least partially fixes by a photoflash fixing device the toner images transferred onto the recording medium by said first transfer printing station;*

*a thermal fixing station following said second transfer printing station in the conveying direction; and*

*the thermal fixing station comprises a pressure thermal fixing station.*

* * * * *